Oct. 27, 1953   J. A. T. ELLISON   2,656,908
PARKING METER CONTROL SYSTEM
Filed Feb. 3, 1950   3 Sheets-Sheet 1

INVENTOR.
JOHN A. T. ELLISON
BY

Oct. 27, 1953 J. A. T. ELLISON 2,656,908
PARKING METER CONTROL SYSTEM
Filed Feb. 3, 1950 3 Sheets-Sheet 2

INVENTOR.
JOHN A.T. ELLISON
BY

Oct. 27, 1953 J. A. T. ELLISON 2,656,908
PARKING METER CONTROL SYSTEM
Filed Feb. 3, 1950 3 Sheets-Sheet 3
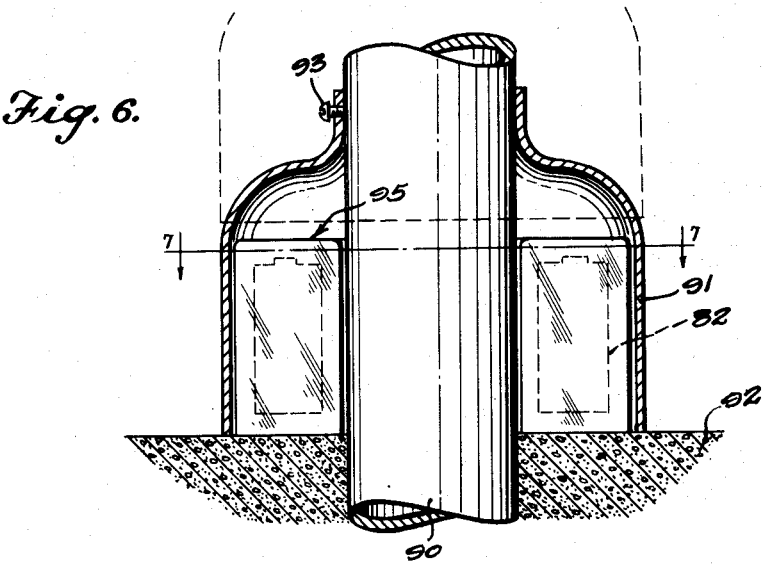
Fig. 6.
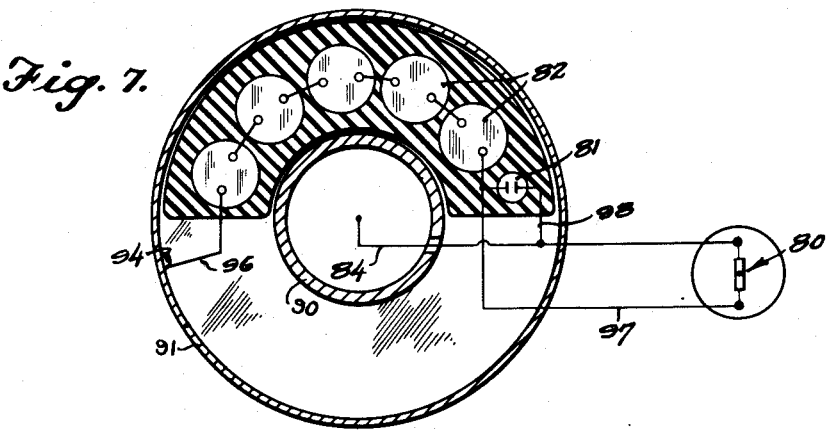
Fig. 7.
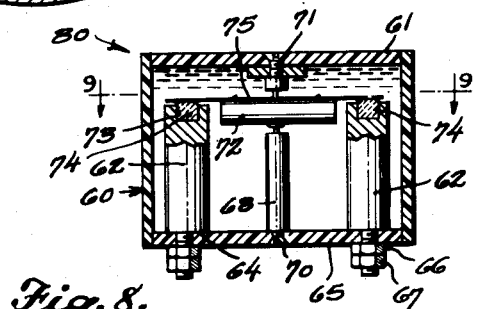
Fig. 8.
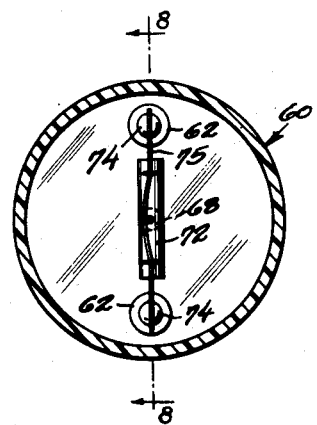
Fig. 9.
INVENTOR.
JOHN A.T. ELLISON Patented Oct. 27, 1953

2,656,908

UNITED STATES PATENT OFFICE 2,656,908

PARKING METER CONTROL SYSTEM

John A. T. Ellison, Seattle, Wash.

Application February 3, 1950, Serial No. 142,149

6 Claims. (Cl. 194—1)

This invention relates to a control for coin-operated parking meters, and purposes to prevent an automobile parked in a meter-governed parking zone from legally using the zone for more than a single parking period irrespective of how many coins may have been inserted in the meter. The invention includes mechanism for automatically nullifying any residue of time remaining on the parking meter when the parked automobile is driven from the zone, and in this respect utilizes structure present in my co-pending United States application, Serial No. 130,046, filed November 29, 1949.

Another object of my invention is to provide a control system that can be utilized with almost any known type of parking meter without necessitating material alteration of the latter.

A further object of my invention is to provide a control system which, when used in a parking meter whose time hand is reset by a spring-loaded driving mechanism, will not materially decrease the number of resets obtainable from each manual winding of the mechanism.

Another object of my invention is to provide a control system including electrically activated means which requires only a minute amount of electrical energy to perform its control function.

Another object of my invention is to provide a magnetic switch for use in my control system which will be opened from a normally closed position by a vehicle of either polarity parked adjacent the switch, and which is dependable in operation, does not arc at the poles, and is of simple and economical construction.

My invention also has as an object a battery pack for use in my control system which is water-proof, can be easily installed and replaced and which is likewise of simple and economical construction.

With the above and other still more particular objects and advantages in view and which, with the foregoing, will appear and be understood in the course of the following description and claims, the invention consists in the novel construction and in the adaptation and combination of parts hereinafter described and claimed.

In the drawings:

Figures 1, 2 and 3 are somewhat schematic views, largely in elevation but partly in section, illustrating a conventional type of coin-operated parking meter equipped with improvements produced in accordance with the preferred embodiment of the present invention, the three views each incorporating a wiring diagram in which is contained a normally closed magnetic switch opened by the circumstance of a vehicle parking in the zone related to the meter. The three views are distinguished in that Fig. 1 portrays the parts of the improved meter in the positions which they occupy when a vehicle is legally parked in the zone and has used only a portion of the purchased parking time. Fig. 2 shows the position of the parts when the purchased parking time has expired and illustrates the manner in which a second coin, introduced while the vehicle still remains in the parking zone, is caused to hang up. Fig. 3 shows the position of the parts when the parking zone is unoccupied.

Fig. 6 is a fragmentary vertical sectional view confined to an illustration of the base structure for the meter, and essentially detailing the battery pack from which the electric circuit for the meter derives its energy.

Fig. 7 is a horizontal sectional view on line 7—7 of Fig. 6.

Fig. 8 is a vertical sectional view illustrating a form of magnetic switch which I find to be especially suitable for carrying the invention into practice; and Fig. 9 is a horizontal sectional view on line 9—9 of Fig. 8.

I have illustrated my invention as applied to a conventional parking meter and hence I will first explain those parts of the meter which are old in the art and then will elaborate on the improvements which I apply thereto.

The time hand 10 is essentially the minute hand of a clock indicating the amount of allowable parking time remaining for a motorist whose car is parked in the related parking zone. An arcuate time dial 12 is portrayed and for purposes of example this dial is shown as having minute readings from 0 to 60 on its face. The hand 10 is journaled on a stationary shaft 11 and after being reset, in a manner to be hereinafter described, opposite the 60 minute reading on the time dial moves counter-clockwise with the passage of time toward the zero reading. A spring-driven clock mechanism supplies the power for this movement, the power being transmitted by friction to a hollow shaft to which the hand is secured, such mechanism and hollow shaft not being illustrated.

Figure 1:
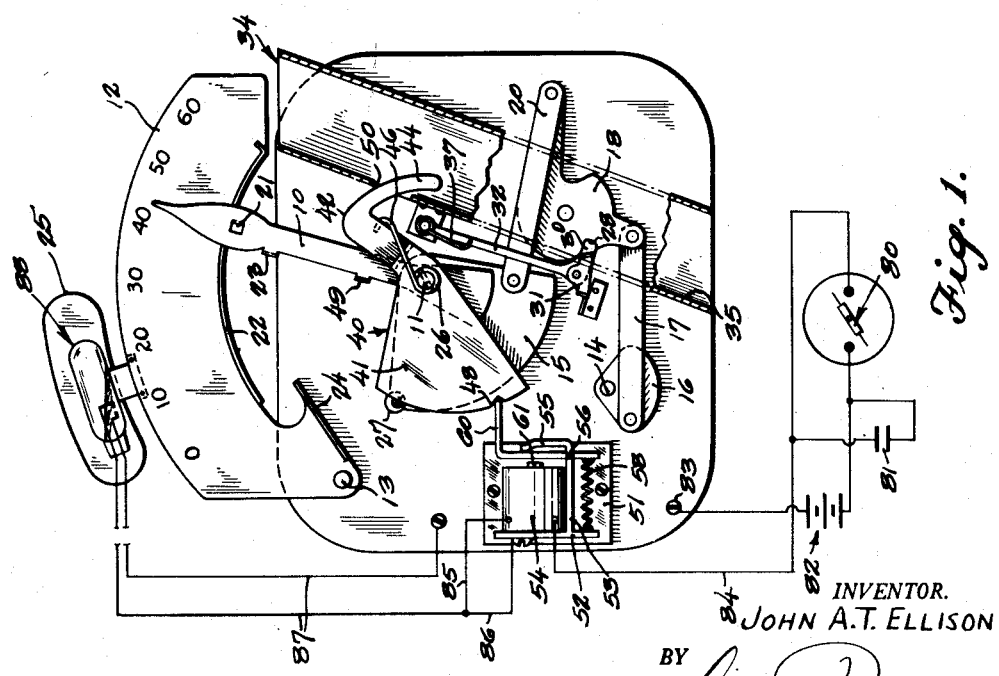

The time dial 12 is freely pivoted for reciprocal movement about a pin 13 secured to the housing and such time dial is held at the upper limit of its said reciprocal travel, as shown in Fig. 1, by a lug 21 struck from the material adjacent the free end of the hand 10, such lug resting beneath and supporting a marginal flange 22 which extends along the bottom edge of the dial. It will be noted that this flange is developed as the arc of a circle made concentric to shaft 11 and runs coextensive with the numerals 0 to 60 on the dial face so that the dial cannot drop downwardly about its pivot pin while parking time remains.

An intermediate lug 23 is provided on the hand in a position slightly below and laterally offset from the lug 21, and as a functioning complement of this lug the dial presents a short flange 24 along its lower edge extending from the inner-end limit of the flange 22 to the approximate root-end limit of the dial. This short flange is offset below the arcuate flange 22 an amount corresponding to the distance between the lugs 21 and 23 so that, as the lug 21 reaches the inner end of the marginal flange 22 the intermediate lug 23 engages beneath the short flange 24 and continues to support the dial 12 after the lug 21 clears the flange 22. As the hand then continues to move in a counter-clockwise direction the travel of the lug 23 along the flange 24 permits the dial to drop slightly so that a red flag mounted at the top side thereof will be shifted into view from an otherwise concealed position offset from the view plate to designate that no parking time remains. The dropping of the dial is accomplished because the short flange 24 is not arcuate and is slightly offset from a tangent to the arcuate path of the lug 23.

A sector 15 is freely journaled about the shaft 11 and presents at the forward end of its arcuate edge an outwardly directed nob 27 for engaging the hand 10. The sector is driven via a linkage comprising a link 20, a bell crank 18, a link 17, and a crank 16, by a spring-loaded mechanism acting on a shaft 14 to which the crank 16 is keyed, such mechanism being effective to rotate the shaft a score of revolutions before requiring rewinding. Directing attention to Fig. 3 it can be seen that as the crank 16 is rotated in a counter-clockwise direction, the link 17 will force the bell crank 18 in the same direction, causing the link 20 to drive the sector 15 in a clockwise direction. As the sector moves in such direction the nob 27 is brought into engagement with the respective side edge of the hand 10, and with further movement it pushes and resets the hand in the 60 minute position. When the hand is reset the link 17 is in alinement with the shaft 14 so that further counter-clockwise rotation of the crank 16 causes the bell crank 18 and sector 15 to reverse directions and return to the original Fig. 3 position at the end of one revolution of the crank 16.

Figure 2:
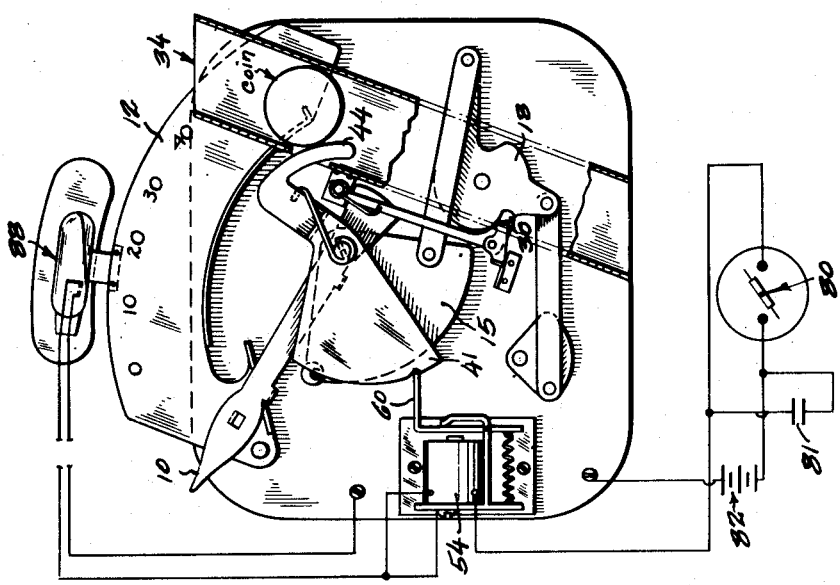
Figure 5:
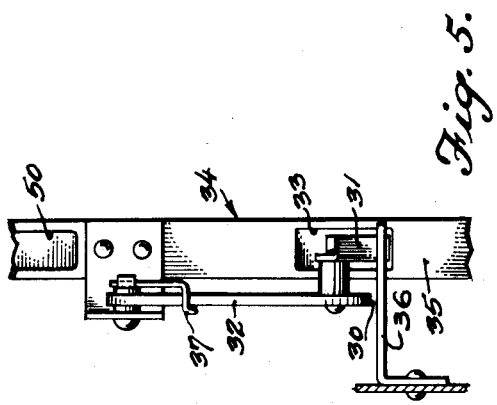
Fig. 5 is a fragmentary transverse vertical sectional view taken to an enlarged scale on line 5—5 of Fig. 3.
Figure 3:
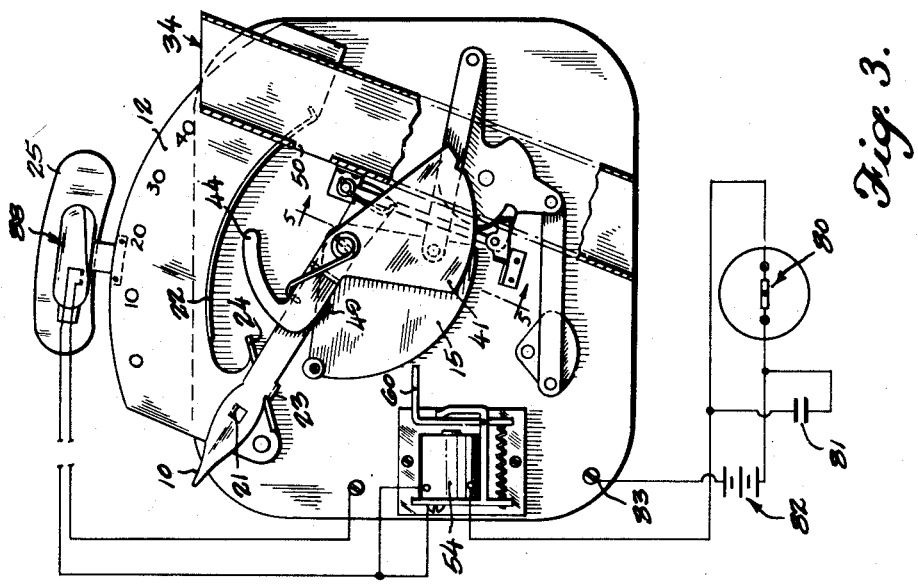

The edge of the bell crank is provided with a re-entrant opening 28. An arm 32 whose upper end is pivotally supported to the frame has formed upon its lower end a substantial foot, the toe element 30 of which closely fits in said opening. The pawl 31 is pivotally mounted on the outside face of this toe element 30 and has two oppositely extending arms, one of which projects through an opening 33 (Fig. 5) in a side wall 35 of the meter coin chute 34 when the toe 30 engages the opening 28 as shown in Figs. 1 to 3, and the other of which is held against a stop 36 by the force of the crank 18 acting on the upper edge of the toe 30. To reset the parking meter, the motorist inserts a coin in the mouth of the chute 34 and as the coin drops it strikes the pawl 31 causing it to turn in a clock-wise direction with respect to the arm 32, such movement releasing the pawl from engagement with the stop 36 and withdrawing it from the chute to permit the coin to continue its travel along the length of the chute. The bell crank 18 is then free to move counter-clockwise as before described and to simultaneously urge the arm 32 outwardly against the pressure of a spring 37 at its root end. The crank 16 then completes a revolution and effects the resetting of the hand 10. As the bell crank returns to its original position at the end of such revolution the toe 30 is urged into engagement with the opening 28 acting on the arm 32, and is locked in such position by the simultaneous engagement of the pawl 31 and stop 36.

The structure thus far explained is old in the art and, lacking the present improvements, has the marked disadvantage that it permits a motorist to leave his car parked in a parking zone indefinitely as long as he keeps inserting coins in the meter. It should be here noted that it is not my intention to limit the scope of my invention to improvements which can only be directly applied to a parking meter identical or very similar to the one above described, the following embodiment of my invention being given by way of example only.

A plate member 40 having a sectoral cam 41 and a hook-shaped arm 42 at diametrically opposite sides is freely journaled on the shaft 11 by a hub 26. The said cam is slightly spaced outwardly from the hand 10 to prevent frictional engagement with the outer faces of the hand and the link 20, as well as to clear the nob 27. The hooked arm 42 is rearwardly spaced from the cam 41 a slightly less amount by an offset 45. The side wall 35 of the coin chute presents an upper opening 50 through which the bill 44 of the hook can pass. A spring 46 is anchored to the shaft 11 at one end and takes a purchase by its other end against the leading edge of the hook's shank so as to spring-load the plate in a manner yieldingly urging the same to move in a counter-clockwise direction.

Figure 4:
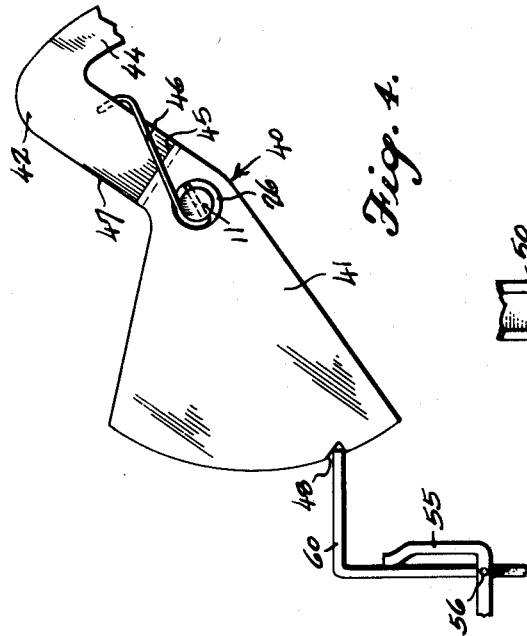
Fig. 4 is a fragmentary enlarged view detailing the sectoral plate shown in the preceding views.

A solenoid is secured to an insulating plate 51 which is in turn screwed to the meter head frame, the plate thus serving to insulate the solenoid from the meter proper. The body 54 of the solenoid is secured at one end to a vertical plate 52 and rests on a horizontal plate 53 which joins at one end to the vertical plate 52 slightly above the lower end of the latter. The free end of the horizontal plate is bent to form an upstanding ear 55 having its upper end bent slightly inward toward the coil 54. Such plate has a lateral slot adjacent the ear through which the vertical leg of an inverted L-shaped dog 60 is passed, such leg being pivotally secured to the plate at each end of the said slot by pins 56. The lower free end of the vertical dog leg extends below the horizontal plate 52 in opposed relation to the lower end of the vertical plate 52, and between and to such lower ends a tensioned spring 58 is suspended serving to urge an upper portion of the leg against the upper end of the ear 55. The horizontal leg of the dog is directed outwardly toward the cam 41 and is such a length that its free end barely clears the arcuate edge of the cam when the dog is drawn against the core 61 of the relay when the solenoid is energized. The lower portion of the arcuate edge presents a V-shaped notch 48 which is engaged by the dog when the bill 44 is in the coin-chute blocking position as in Fig. 4. It will be noted that when the notch is so positioned, its upper edge slopes upwardly to form an acute angle with the plane of the horizontal leg of the dog. The notch's lower edge is shorter than its upper edge and slopes downwardly. When the dog engages the notch it serves to resist the spring 46 and hence prevents counterclockwise movement of the plate member 40. The above described shape of the notch is such that very little magnetic force is required to draw the dog from the notch.

The hand 10 is furnished at its lower end with an outwardly extending return lug 49 which is engageable by the outside edge 47 of the hook's shank. Thus, as is apparent in Fig. 3, as the nob 27 engages and pushes the hand 10 toward the 60 minute end of the dial during the reset operation, the lug 49 will engage the hook's shank and cause clockwise rotary movement of the plate member 40 in opposition to the spring 46 so that when the hand reaches the 60 minute setting the hook bill 44 will be reset in its chute-blocking position, the spring 46 will be tensioned, and the dog will be urged into the notch 48 by the spring 58 to lock the plate member 40. Looking to Fig. 1, it is apparent that when the dog is withdrawn from the notch, the spring 46 will cause counterclockwise rotary movement of the plate member 40, and if the hand is not already at zero reading, the hook's shank will be brought into engagement with the lug 49 of the frictionally driven hand and will thence push the hand to the zero end of the dial wherein the parts assume the Fig. 3 relationship.

From the foregoing it will be seen that every time the hand is reset by the insertion of a coin in the coin-chute the hook bill 44 will be reset automatically in a chute-blocking position, wherein, as illustrated in Fig. 2, regardless of how much time has passed, another coin cannot travel the length of the chute to again reset the hand until the dog is withdrawn from the notch by energizing the relay. It has also been shown that every time the relay is thus energized, the plate member 40 will automatically return the hand to zero. Therefore, I provide an electrical circuit, to be now explained, which will automatically energize the relay when, and only when, an automobile is driven from the related parking zone, this circuit being similar to that disclosed in my co-pending application afore noted. This circuit requires a switch which is automatically opened when an automobile is parked and which is automatically closed when the parking zone is vacant. A switch unit meeting these requirements is disclosed in Figures 8 and 9. The unit is preferably housed in a cylindrical container 60 having a bottom wall formed integral with the side wall and is sealed by a lid 61 which is bonded to the top of the side wall after the unit is assembled. The container may be formed of plastic or other suitable material not susceptible to magnetic attraction. Emanating upwardly from the container floor are two diametrically spaced identical poles 62 formed of copper or other electrically conductive material. Such poles are necked down at the base so as to form abutment shoulders 64, and have the necks threaded. The container floor 65 has tapped openings for treadably receiving the neck portions and when received the necks protrude slightly below the floor and are fitted with nuts 66 and 67. When the unit is installed for use, conventional wire leads are secured between the nuts. The top of each pole is provided with a short cylindrical pocket 73. These are so filled with mercury 74 that the mercury protrudes slightly above the top face of each pole, and will hereinafter be termed as mercury pots. An upstanding post 68 of brass or other suitable non-magnetic material is secured by a screw 70 to the center of the container floor. Suspended from the center of the cover 61 is a screw 71. A bar magnet 72 is freely mounted at its center for rotary movement between the top of the rod 68 and the foot of the screw 71, such magnet being shorter than the distance between the poles 62. A conductive wire 75 is secured to the top of the bar magnet, and is of such length and so positioned that its ends will contact the mercury protruding above the mercury pots as the magnet swings and thus complete a circuit between the poles. When such a unit is mounted near a parking zone with the poles alined in such a direction that the wire 75 bridges the mercury pots when the magnet assumes its natural position, the attraction or repulsion of an automobile thereafter parked will swing the magnet out of alinement with the poles and open the switch. Thus the switch will be opened automatically regardless of the polarity of the automobile. Preferably the container 60 is filled with kerosene, or some other liquid of similar viscosity, which will prevent oxidation of the switch parts and will properly dampen the movement of the bar magnet.

As illustrated diagrammatically in Figures 1 to 3, such a switch unit, designated by 80, is placed in series with the solenoid 54. A group of dry cell storage batteries 82 is connected by a lead to one of the switch poles and is grounded at 83 to the meter housing by another lead. The other switch pole is connected by a lead 84 to a terminal of the solenoid. It is desirable to use a condenser 81 in parallel with the switch 80 to insure a surge of current through the switch when the latter is closed. The ground lead 85 of the relay branches into two parallel ground circuits 86 and 87. The first grounds through the vertical and horizontal plates 52 and 53, the dog, and through the plate member 40 into the meter frame when the dog is engaged with the notch 48. Such ground circuit is, perforce, opened when the dog is withdrawn from the notch. The other ground circuit 87 includes a floating type mercury switch 88 which is secured to the flag 25 in such a manner that as long as time remains on the meter so that the flag is tilted to one side as in Fig. 1, the mercury will settle to the terminal end of the switch and complete the ground circuit to the meter frame. This second ground circuit has less resistance therein than the first through the dog so that the latter will only operate when there is no parking time remaining. Occasionally the ground circuit through the dog may arc somewhat so that the purpose of the other ground-circuit 87 is to greatly reduce the number of times that the circuit is required to ground through the dog, namely, by eliminating those relatively numerous occasions when time remains on the dial when the motorist drives from the parking zone.

In the Fig. 1 situation the car is parked, the magnetic switch 80 being opened by the attraction thereof, a coin has been inserted to reset the meter, and a few minutes have since passed. If the car were to be moved the magnetic switch would close completing a circuit through the relay and floating ground switch 88 so that the dog would be withdrawn from the notch and the plate member 40 would return the hand to zero so that the parts would be in Fig. 3 position wherein it is important to note that both ground circuits are open because the flag 20 is horizontal and the dog and notch are not in contact. Thus the batteries are not dissipated when the parking zone is not occupied.

In the Fig. 2 situation the motorist's parking time has run out and he has attempted to use another coin to reset the meter. The hook bill will continue to obstruct the coin's downward travel until the motorist drives his automobile away which will cause the magnetic switch 80 to close completing a circuit through the relay and the dog ground circuit whereupon the plate member 40 will be released. When the hook bill is thence withdrawn from the coin-chute, the coin will drop and strike the pawl 31 as usual, permitting the aforedescribed hand-resetting mechanism to operate, whereupon the hand will be reset to 60 and the notch will be again brought into engagement with the dog. However, the circuit will at that moment be completed through the relay and ground since the magnetic switch is still closed so that the dog again will be withdrawn by the relay from the notch and the plate member and the hand will automatically return to the Fig. 3 position as before.

In Figures 6 and 7, I disclose an arrangement whereby the batteries 82 and condenser 81 can be housed at the base of the parking meter and yet be kept in a perfectly dry state. The numeral 90 represents a hollow upstanding standard to which the meter head is attached, the root end of the standard being embedded in concrete 92. A bell shaped housing 91 placed in a surrounding relationship to the base of the standard and with its neck slidably engaging the latter. The said neck is provided with a screw 93 for detachably holding the bell 91 against the surface of the concrete 92. This arrangement of the standard and bell is conventional, the bell serving to assist in the stabilizing of the standard in its upright position.

The batteries 82 for supplying current to the solenoid are a small dry cell type. They are wired together in series and to the condenser 81 after which the batteries and condenser are embedded in a horseshoe shaped body 95 molded of tar or other suitable material which is non-conductive, water-proof, and easily molded, thus forming a water-proof battery pack. The internal and external diameters of the pack are respectively defined by the outside diameter of the standard and the inside diameter of the bell so that the pack can be fitted in the cavity between the standard and the bell. A ground lead 96 to the pack is secured by a screw 94 to the bell. Another lead 97 connects the batteries to the magnetic switch unit. The return lead 84 from the said switch, after being joined by a lead 98 from the condenser, passes through an aperture in the standard whence it is carried up through the hollow standard to the solenoid.

To exchange batteries for a parking meter equipped with my device it is only necessary to loosen the screw, slide the bell up the standard until the battery pack is revealed, disconnect the leads, replace the pack, reconnect the leads, lower the bell and retighten the screw.

The advantage of the invention will, it is thought, have been clearly understood from the foregoing detailed description of the embodiments which I have elected to illustrate. Minor changes in the details of construction will suggest themselves and may be resorted to without departing from the spirit of the invention, wherefor it is my intention that no limitations be implied and that the hereto annexed claims be given a scope fully commensurate with the broadest interpretation to which the employed language admits.

What I claim, is:

1. In combination with a coin-operated parking meter related to a given parking zone and embodying a coin chute and time-indicating means reset by the passage of a coin along said chute for visually indicating a predetermined permissible parking time, and with the passage of time indicating the amount of the said parking period remaining, a normally closed magnetic switch opened by attraction or repulsion of a vehicle parked in the zone, means provided in the meter movable from a normally inactive position, and controlled by a coin-activated resetting of the time-indicating means, into an interruptive position in the travel path of a coin moving along said coin chute to prevent a resetting operation, locking means contained in an electric circuit including said magnetic switch for releasably locking the coin-interrupting means in its coin-interrupting position and caused to be unlocked by a closing of the switch, and means for moving said coin-interrupting means into its said inactive position when the locking means is unlocked.

2. In combination with a coin-operated parking meter related to a given parking zone and embodying a time scale and a pivotally mounted time-indicating pointer together with associated operating mechanism by which the pointer, under normal conditions, is given a setting at the top of the scale by the deposit of a coin in the coin chute of the meter and thereupon, with the passage of time, moves about its pivot toward a zero reading on the scale, a magnetic switch caused to be automatically opened when a vehicle occupies the parking zone and closed when the zone is vacant, an electric circuit including said switch, a pivotally mounted arm swingable from an inactive position into a coin-blocking position in the coin-chute, an activating lug for the arm carried by the pointer and functioning to push the arm into its coin-blocking position as the pointer takes a setting at the top of the scale, the arm serving in turn to push the pointer to a zero reading on the scale as the arm moves toward its inactive position, means yieldingly urging the arm into its said inactive position, lock means releasably locking the arm in its coin-blocking position, and electrically controlled means in said electric circuit for effecting said release of the lock means.

3. In combination with a coin-operated parking meter related to a given parking zone and embodying a coin chute and time-indicating means reset by the passage of a coin along said chute for visually indicating a predetermined permissible parking time, a normally closed switch caused to be opened by the parking of a vehicle in the zone, means provided in the meter movable from a normally inactive position, and controlled by a coin-activated resetting of the time-indicating means, into an interruptive position in the travel path of a coin moving along said coin chute to prevent a resetting operation, locking means contained in an electric circuit including said switch for releasably locking the coin-interrupting means in its coin-interrupting position and caused to be unlocked by a closing of the switch, and means for moving said coin-interrupting means into its said inactive position when the locking means is unlocked.

4. The structure of claim 3 wherein means are provided for opening said circuit automatically when said locking means is released.

5. In combination with a coin-operated parking meter related to a given parking zone and embodying a coin chute and time-indicating means reset by the passage of a coin along said chute for visually indicating a predetermined permissible parking time, a normally closed switch caused to be opened by the parking of a vehicle in the zone, means provided in the meter movable from a normally inactive position, and in response to a coin-activated resetting of the time-indicating means, into an interruptive position in the travel path of a coin moving along said coin chute to prevent a resetting operation, locking means contained in an electric circuit including said switch for releasably locking the coin-interrupting means in its coin-interrupting position and caused to be unlocked by a closing of the switch, means for moving said coin-interrupting means into its said inactive position when the locking means is unlocked, and means for moving said time-indicating means into a position indicating that no parking time remains in response to such an inactivation of the coin-interrupting means.

6. In a coin-operated parking meter, a time-indicating pointer and a coin-blocking arm pivotally mounted for swinging movement about a common axis, said pointer being provided with a lug arranged to engage the arm for moving the latter in concert with the pointer in one direction of travel and to be engaged by the arm for moving the pointer in concert with the arm in the reverse direction of travel, such lug permitting independent movement of the pointer in said reverse direction.

JOHN A. T. ELLISON.

References Cited in the file of this patent

UNITED STATES PATENTS

| Number | Name | Date |
|---|---|---|
| 924,573 | Patterson | June 8, 1909 |
| 1,285,934 | Carlson | Nov. 26, 1918 |
| 1,289,637 | Bruce | Dec. 31, 1918 |
| 2,231,563 | Castor | Feb. 11, 1941 |
| 2,251,407 | Johns | Aug. 5, 1941 |
| 2,264,479 | Munson | Dec. 2, 1941 |
| 2,431,116 | Grover | Nov. 18, 1947 |